United States Patent
Zheng et al.

(10) Patent No.: US 8,670,675 B2
(45) Date of Patent: Mar. 11, 2014

(54) SYSTEM AND METHOD FOR DISTORTION COMPENSATION INCLUDING CONFIGUREABLE DELAY

(75) Inventors: Jun Zheng, Houston, TX (US); Yi Wang, Katy, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 219 days.

(21) Appl. No.: 12/976,136

(22) Filed: Dec. 22, 2010

(65) Prior Publication Data

US 2012/0163832 A1 Jun. 28, 2012

(51) Int. Cl.
*H04B 10/04* (2011.01)

(52) U.S. Cl.
USPC ........... 398/193; 398/194; 398/159; 398/161; 398/182

(58) Field of Classification Search
USPC ......... 398/193, 192, 194, 195, 158, 159, 161, 398/102, 53, 182; 375/296, 254, 346
See application file for complete search history.

(56) References Cited

U.S. PATENT DOCUMENTS

| | | | |
|---|---|---|---|
| 3,400,211 A * | 9/1968 | Davies et al. | 348/458 |
| 6,349,216 B1 * | 2/2002 | Alberth et al. | 455/550.1 |
| 6,956,991 B2 | 10/2005 | Madsen | |
| 7,197,053 B1 * | 3/2007 | Liu et al. | 370/503 |
| 7,212,695 B2 | 5/2007 | Kasper et al. | |
| 7,254,828 B2 | 8/2007 | Hunter | |
| 7,542,526 B2 * | 6/2009 | Bobier et al. | 375/340 |
| 7,925,170 B2 * | 4/2011 | Ishaug | 398/193 |
| 7,945,172 B2 * | 5/2011 | Huang et al. | 398/193 |
| 8,121,493 B2 * | 2/2012 | Zheng et al. | 398/194 |
| 8,369,712 B2 * | 2/2013 | Huang et al. | 398/193 |
| 2009/0041474 A1 * | 2/2009 | Ishaug | 398/193 |
| 2009/0153213 A1 * | 6/2009 | Jia et al. | 327/261 |
| 2009/0175160 A1 * | 7/2009 | Iraji et al. | 370/208 |
| 2012/0183299 A1 * | 7/2012 | Zheng et al. | 398/115 |

OTHER PUBLICATIONS

PCT International Search Report and Written Opinion mailed Apr. 23, 2012 for corresponding PCT Application No. PCT/US11/65107, 8 pgs.

* cited by examiner

*Primary Examiner* — Daniel Washburn
*Assistant Examiner* — Hibret Woldekidan
(74) *Attorney, Agent, or Firm* — Grossman Tucker Perreault & Pfleger, PLLC; Norman S. Kinsella (57) ABSTRACT

A distortion compensation circuit including a configurable delay may be used with one or more non-linear elements, such as a laser, to compensate for distortion generated by the non-linear element(s), for example, in broadband RF applications. Embodiments of the distortion compensation circuit may include a primary signal path with a configurable delay segment and a secondary signal path including at least one distortion generator. The configurable delay segment may be selectively configured to provide different delay settings to accommodate different RF loading conditions such that the delayed RF signal on the primary signal path is aligned with the distortion products generated on the secondary signal path when combined to form an RF signal with distortion compensation.

10 Claims, 5 Drawing Sheets

SYSTEM AND METHOD FOR DISTORTION COMPENSATION INCLUDING CONFIGUREABLE DELAY

TECHNICAL FIELD

The present invention relates to distortion compensation and more particularly, to systems and methods for distortion compensation including a configurable delay.

BACKGROUND INFORMATION

A directly modulated laser may be used as an optical transmitter that transmits light at a given wavelength. The power (i.e., amplitude) of the laser light is modulated by corresponding modulation of the current used to drive the laser. For example, the optical transmitter may be modulated to carry a wide-band RF signal. In this case, the electrical current that drives or pumps the laser is modulated with the wide-band RF signal.

The use of a directly-modulated laser to carry a wide-band RF signal may result in distortion due to the multiple carrier frequencies of the multichannel RF signal modulating the laser and/or the harmonics produced by the non-linear nature of the laser device.

Intermodulation distortion may be produced when two or more signals (e.g., 2 or more carriers) mix together to form distortion products. Distortion may include even-order distortion (e.g., second-order distortion products) and odd-order distortion (e.g., third-order distortion products).

Second-order intermodulation ($IM_2$) distortion products may include, for example, intermodulation products formed by combining signals at frequencies A and B to produce new signals at the combined frequencies, such as A±B. The sum of second-order intermodulation products that are present at a particular frequency is commonly referred to as composite second order (CSO) distortion. Third-order intermodulation ($IM_3$) distortion products may include, for example, intermodulation products formed by combining signals at frequencies A, B, and C to produce new signals at frequencies A±B±C and 2A±B. The sum of these third-order intermodulation products that are present in a particular channel is commonly referred to as composite triple beat (CTB) distortion.

Several techniques have been proposed or employed to compensate for distortion by injecting distortion of equal magnitude but opposite phase to the distortion produced by the laser device. For example, a predistortion circuit may be employed to predistort the RF signal being applied to modulate the laser. One such predistortion circuit includes split signal paths—a main or primary signal path and a secondary signal path. A small sample of the RF input is tapped off the main signal path and a distortion generator in the secondary signal path generates distortion (i.e., predistortion). The predistortion is then combined with the RF signal on the primary signal path such that the predistortion is of equal magnitude but opposite sign to the laser-induced distortion.

In such predistortion circuits, the main signal path often delays the RF signal such that the predistortion is properly aligned with the RF signal when combined to form a predistorted RF signal. Recent developments in optical transmitters have produced transmitters capable of different RF loading conditions such that the predistortion is generated differently on the secondary signal path. Such developments have resulted in a previously-unrecognized need for different delays on the primary signal path to accommodate the different RF loading conditions.

BRIEF DESCRIPTION OF THE DRAWINGS

These and other features and advantages will be better understood by reading the following detailed description, taken together with the drawings wherein.

DETAILED DESCRIPTION

A distortion compensation circuit including a configurable delay, consistent with embodiments of the present invention, may be used with one or more non-linear elements, such as a laser, to compensate for distortion generated by the non-linear element(s), for example, in broadband RF applications. As will be described in greater detail below, embodiments of the distortion compensation circuit may include a primary signal path with a configurable delay segment and a secondary signal path including at least one distortion generator. The configurable delay segment may be selectively configured to provide different delay settings to accommodate different RF loading conditions such that a delayed RF signal on the primary signal path is aligned with the distortion products generated on the secondary signal path when combined to form an RF signal with distortion compensation.

Distortion compensation circuits may include predistortion circuits, which generate compensating distortion before the non-linear element(s), for example, in an optical transmitter. Distortion compensation circuits may also include postdistortion circuits, which generate compensating distortion after the non-linear element(s), for example, in an optical receiver. Although some of the exemplary embodiments may refer specifically to predistortion circuits, the concepts described herein may be used with predistortion compensation, postdistortion compensation, or a combination thereof. Thus, distortion compensation circuits, consistent with the embodiments described herein, may be used to compensate for distortion produced by one or more non-linear elements before and/or after the distortion compensation circuits.

Figure 1:
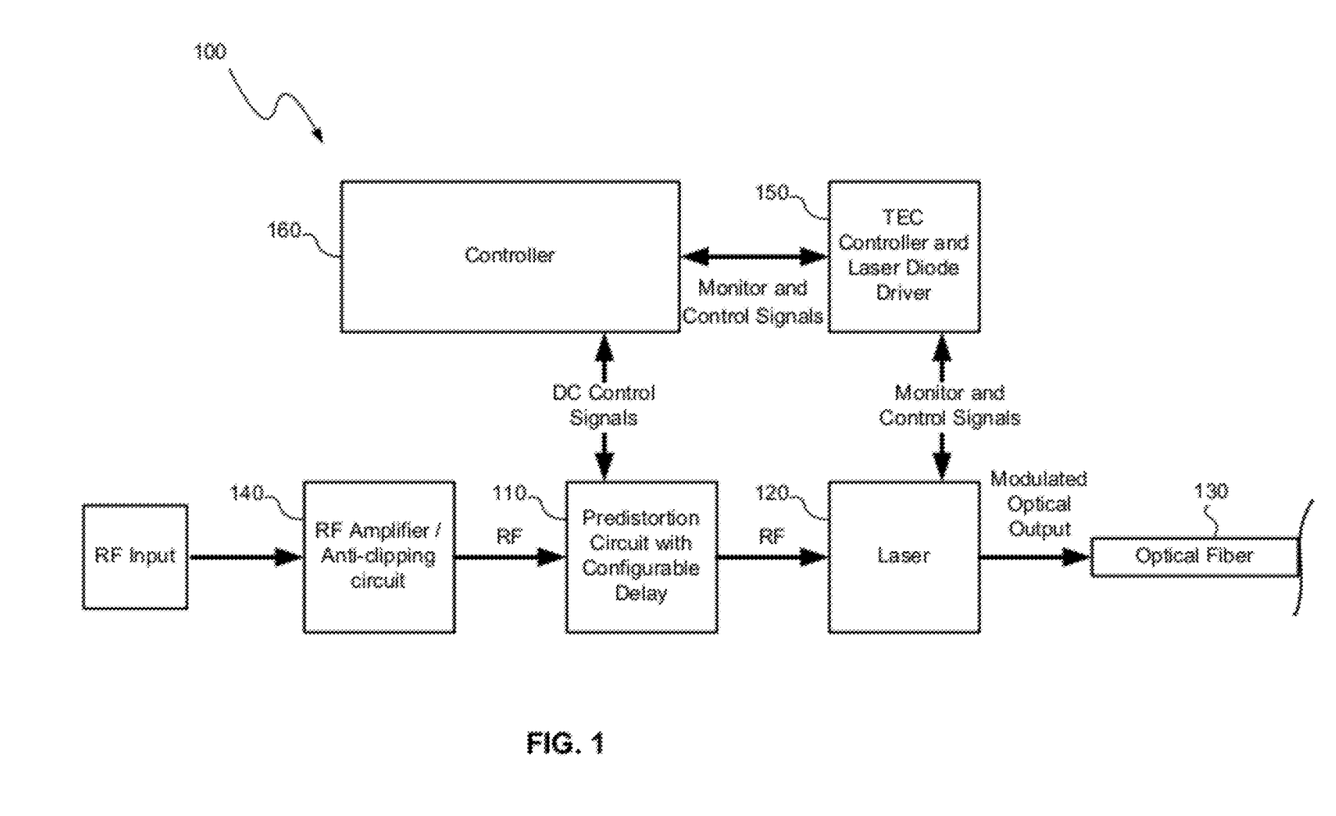
FIG. 1 is a schematic diagram of an optical transmitter including a predistortion circuit, consistent with one embodiment of the invention.

Referring to FIG. 1, an optical transmitter 100 may include a predistortion circuit 110 to generate predistortion that compensates for distortion produced by one or more non-linear elements, such as a laser 120 and/or an optical fiber 130 when an RF signal modulates the laser 120 to produce a modulated optical output coupled into the optical fiber 130. As used herein, "compensate" or "compensating" for distortion means reducing distortion to a point that is tolerable in a particular system and does not necessarily require elimination of distortion. To compensate for distortion produced by the laser 120, the predistortion may be generated by the predistortion circuit 110 with a magnitude substantially equal to the magnitude of the distortion produced by the laser 120 and a phase that is substantially opposite the phase of the distortion produced by the laser 120, optical fiber 130 and/or other non-linear elements such as amplifier non-linearities. The predistortion circuit 110 combines the predistortion with the RF signal, which has been delayed with a configurable delay such that the predistortion is properly aligned with the RF signal, to produce a predistorted RF signal that modulates the laser 120.

According to one embodiment, the optical transmitter 100 may include RF amplifier/anti-clipping circuit 140 to receive and amplify the RF input signal (e.g., a multi-channel carrier multiplex signal) and/or to modify the RF input signal to prevent or reduce clipping in the laser 120. Examples of anti-clipping circuits are described in greater detail in commonly-owned U.S. Patent Application Publication Nos. 2009/0278583, 2008/0292324 and 2008/0292323, which are incorporated herein by reference. The predistortion circuit 110 may then receive the amplified RF signal, generate the predistortion from the RF signal, and combine the predistortion with the delayed RF signal to produce the predistorted RF signal that modulates the laser 120. The laser 120 may be a directly-modulated electrically pumped semiconductor laser, such as a laser diode.

One embodiment of the optical transmitter 100 may further include thermo-electric cooler (TEC) controller and laser diode driver circuitry 150 to control the temperature of and to bias the laser 120. A controller 160, such as a microprocessor, may be used to control the components and the operation of the optical transmitter 100. The TEC controller and laser diode driver circuitry 150 and the microcontroller 160 may include components known to those skilled in the art for use in a laser transmitter, such as the type available from Applied Optoelectronics, Inc.

The optical transmitter 100 may support multiple operation modes (e.g., channel plans) that provide different RF loading conditions. One example of the optical transmitter 100 is a 1 GHz QAM transmitter that provides different channel plans or QAM modes, such as the type available from CISCO under the name Prisma II 1 GHz SuperQAM transmitter, which provides QAM channel plans or modes with 16, 32, 50 or 153 QAM channels. In such a transmitter, for example, the 153 channel mode provides a substantially different RF loading condition as compared to the 15, 32 or 50 channel modes. During the 153 channel mode, therefore, the RF signal is delayed longer before combining the delayed RF signal with the predistortion within the predistortion circuit 110, as will be described in greater detail below.

The embodiments described herein have particular application in QAM systems with different channel plans or QAM modes, although they could be applied to any system in which different RF loading conditions result in differences in the generation of predistortion. The distortion compensation circuits and methods described herein may also be used in other applications (e.g., using different or even higher frequencies) and/or with other types of optical transmitters. Embodiments of the distortion compensation circuits may also be used with any non-linear element or device that generates distortion that can be compensated with predistortion or postdistortion.

Figure 2:
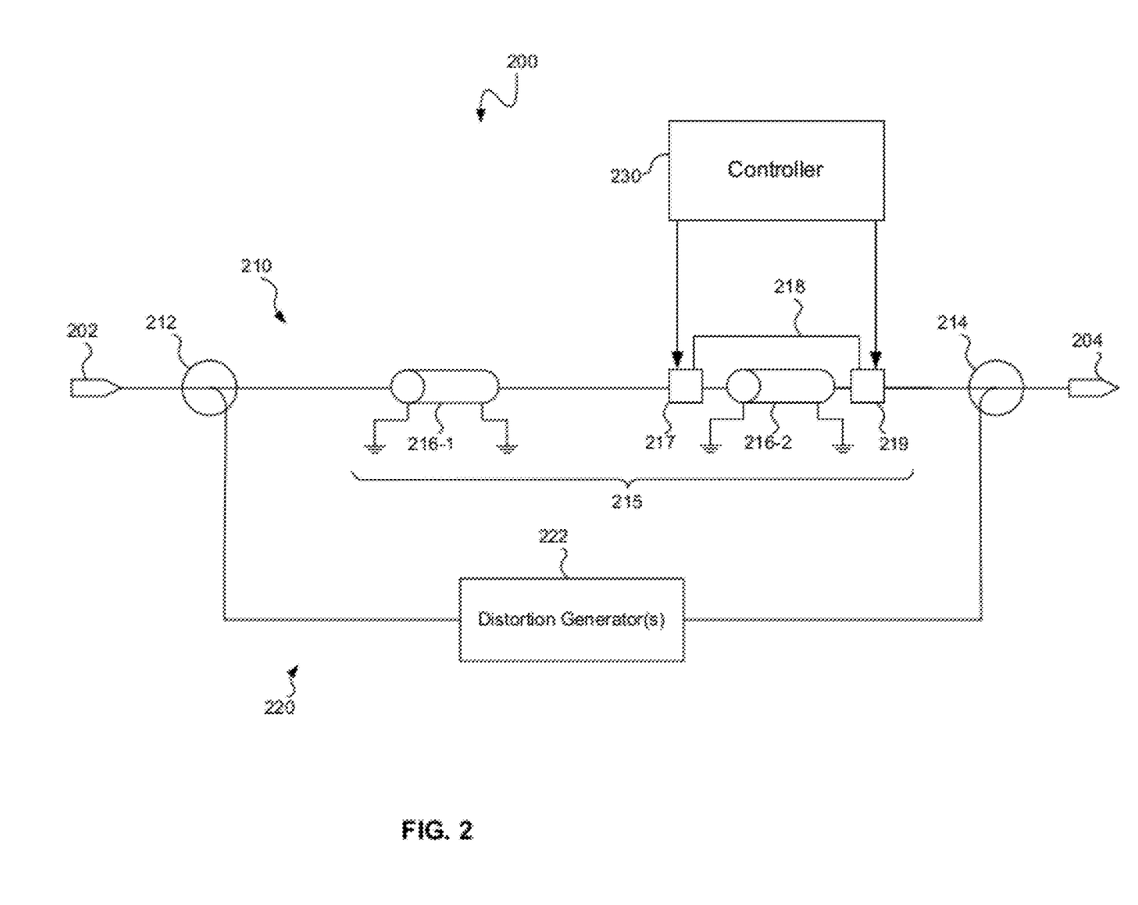
FIG. 2 is a schematic diagram of a distortion compensation circuit including a configurable delay segment, consistent with one embodiment of the invention.

Referring to FIG. 2, a distortion compensation circuit 200, consistent with an embodiment of the present invention, is described in greater detail. The distortion compensation circuit 200 receives an RF input signal at a signal input 202, generates compensating predistortion and/or postdistortion, and provides the RF signal combined with the compensating predistortion and/or postdistortion at a signal output 204. The distortion compensation circuit 200 may include a primary signal path 210 and a secondary signal path 220 that are coupled together, for example, using directional couplers such as a directional splitter 212 and a directional combiner 214. At the directional splitter 212, at least a portion of the RF input signal power is received on the primary and secondary signal paths 210, 220, respectively.

The secondary signal path 220 produces intermodulation distortion products from the RF input signal received on the secondary signal path 220. In the exemplary embodiment, the distortion compensation circuit 200 compensates for composite second order (CSO) distortion and the secondary signal path 220 produces second-order intermodulation distortion products. In other embodiments, the distortion compensation circuit 200 may also compensate for composite triple beat (CTB) distortion in addition to or instead of CSO by producing third-order intermodulation distortion products on the secondary signal path 220 or another signal path. Similarly, higher orders of intermodulation distortion may also be compensated.

At the directional combiner 214, intermodulation distortion products produced on the secondary signal path 220 are combined with the RF input signal on the primary signal path 210 with a desired magnitude and phase to compensate for distortion. Where the distortion compensation circuit is a predistortion circuit, the intermodulation distortion products provide compensating predistortion combined with the RF signal to produce a predistorted RF signal that compensates for distortion generated by one or more non-linear elements (not shown) following the distortion compensation circuit 200. Where the distortion compensation circuit 200 is a postdistortion circuit, the intermodulation distortion products provide compensating postdistortion combined with the RF signal to compensate for the distortion already caused by one or more non-linear elements (not shown) located before the distortion compensation circuit 200.

The primary signal path 210 includes a configurable delay segment 215 that delays the RF input signal on the primary signal path 210 to correspond substantially to the delay caused by generating the compensating distortion on the secondary signal path 220. Such a delay helps to ensure that the compensating distortion on the secondary signal path 220 remains substantially in phase with the RF input signal on the primary signal path 210. The configurable delay segment 215 may be selectively configured, for example, in response to control signals from a controller 230, to provide at least two different delay settings for at least two different RF loading conditions.

In one embodiment, the configurable delay segment 215 includes at least a fixed delay element 216-1 coupled to the primary signal path 210 and a switchable delay element 216-2 switchably coupled to the primary signal path 210. The delay elements 216-1, 216-2 may include transmission lines of a selected length, which provide a delay corresponding to the length. The switchable delay element 216-2 and a bypass line 218 may be switchably coupled to the primary signal path 210 using controllable switches 217, 219. The controllable switches 217, 218 may thus cause the RF signal on the primary signal path 210 to pass through either the switchable delay element 216-2 with the associated delay or through the bypass line 218 with minimal or negligible delay. The controller 230 (e.g., a microprocessor) may provide control signals to the controllable switches 217, 219 to control the switching, for example, in response to an anticipated change in the RF loading conditions. The configurable delay segment 215 may thus be controllably configured such that both of the delay elements 216-1, 216-2 contribute to the delay of the RF signal on the primary signal path 210 or only the fixed delay element 216-1 contributes to the delay.

The secondary signal path 220 includes one or more distortion generators 222 that generate the intermodulation distortion products from the RF input signal. In a distortion compensation circuit that compensates for CSO distortion, the distortion generator(s) 222 may include CSO distortion generators including a square law device that generates second order intermodulation products. A CSO distortion generator (or second order distortion generator) does not necessarily generate only second order distortion. A CSO distortion generator (or second order distortion generator) may include a distortion generator that produces even-order distortion with predominantly second order distortion. In a distortion compensation circuit that compensates for odd orders of distortion, other distortion generators may be used such as CTB distortion generators to compensate for CTB distortion. A CTB distortion generator may include a distortion generator that produces odd-order distortion with predominantly third order distortion. Distortion compensation circuits and distortion generators are described in greater detail in U.S. Patent Application Publication Nos. 2009/0196630, 2009/0196629, and 2009/0041474, which are incorporated herein by reference.

The secondary signal path 220 may also include one or more gain control elements (not shown), such as a variable attenuator and/or an amplifier, before and/or after the distortion generator 222 to control a magnitude of the compensating distortion generated by the distortion generator 222. Variable gain control elements help to ensure that the magnitude of the compensating distortion corresponds sufficiently to the magnitude of the distortion being compensated. The variable attenuators may be PIN attenuators and may receive attenuation control signals from a controller (e.g., controller 160 shown in FIG. 1) to adjust the attenuation as needed. The secondary signal path 220 may also include a delay element or a configurable delay segment to add small amounts of delay in the secondary signal path, for example, to "zero" out any path length differences.

Figure 3:
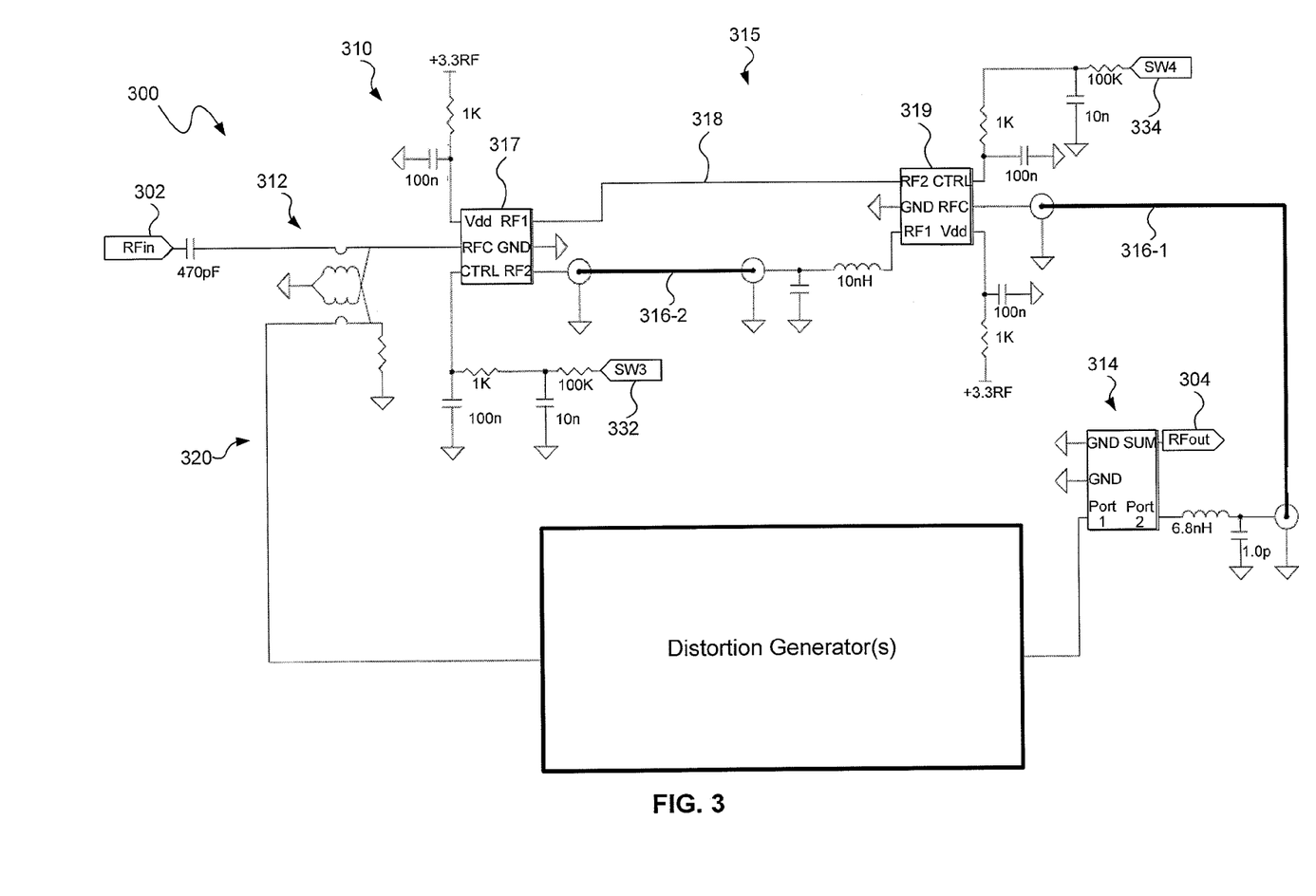
FIG. 3 is a schematic diagram of a distortion compensation circuit including a configurable delay segment, consistent with another embodiment of the invention.

Referring to FIG. 3, an embodiment of a predistortion circuit 300 for use with a multi-mode QAM transmitter is shown and described. The predistortion circuit 300 includes an RF input 302 and an RF output 304 and includes a primary signal path 310 coupled to a secondary signal path 320 with couplers 312, 314. The primary signal path 310 includes a configurable delay segment 315 including a longer, fixed primary delay line 316-1 and a shorter, switchable secondary delay line 316-2. The secondary delay line 316-2 and a bypass line 318 are coupled to controllable switches 317, 319. In response to switch control signals applied to the control signal inputs 332, 334, the controllable switches 317, 319 cause the RF signal to pass through either the secondary delay line 316-2 or the bypass line 318.

In a multi-mode QAM transmitter with 16, 32, 50 and 153 channel settings or QAM modes, for example, the delay provided by the primary delay line 316-1 may be sufficient for the loading conditions provided by the 16, 32, and 50 channel QAM modes and the additional delay provided by the secondary delay line 316-2 may be added for the 153 channel QAM mode. When operating in the 16, 32, and 50 channel QAM modes, therefore, the control signals provided to the control inputs 332, 334 cause the switches 317, 319 to bypass the secondary delay line 316-2 by routing the RF signal through the bypass line 318. When operating in the 153 channel QAM mode, the control signals provided to the control inputs 332, 334 cause the switches 317, 319 to switch to the secondary delay line 316-2 and route the RF signal through the secondary delay line 316-2, thereby adding the additional shorter delay for the different RF loading condition provided by the 153 channel QAM mode.

When operating in the 153 channel QAM mode, control signals may also be sent (e.g., from a controller) to the distortion generator circuitry to change the distortion generation setting. In one embodiment, the control signals may adjust a bias current supplied to diodes in the distortion generator circuitry to adjust the generation of distortion products to compensate for frequency-dependent distortion when the frequency loading condition changes. Distortion compensation techniques have been developed for frequency-dependent distortion, for example, as described in U.S. Patent Application Publication Nos. 2009/0041474 and 2009/0196629, which are fully incorporated herein by reference.

Figure 4:
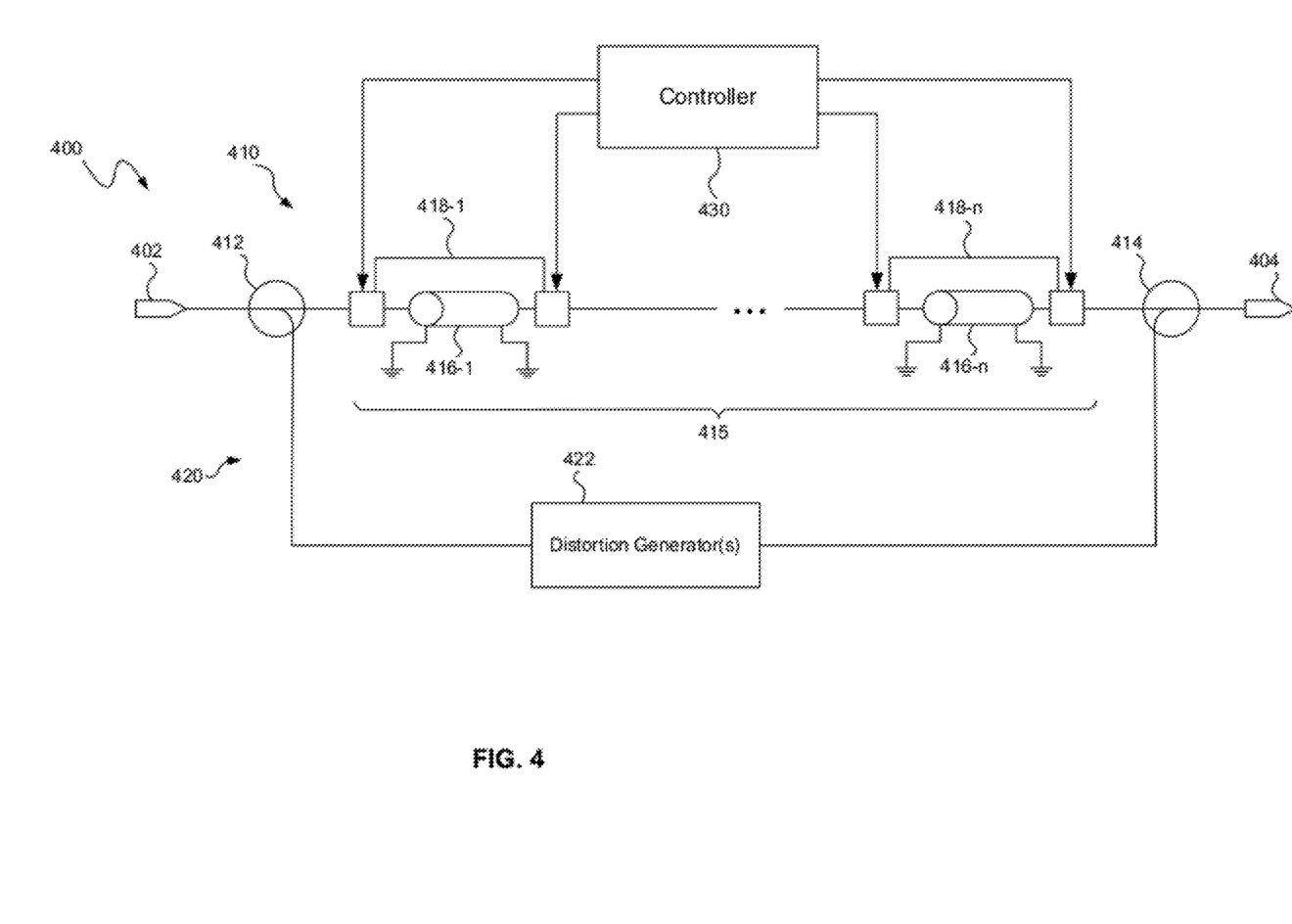
FIG. 4 is a schematic diagram of a distortion compensation circuit including a configurable delay segment, consistent with a further embodiment of the present invention.

FIG. 4 shows a further embodiment of a predistortion circuit 400 including a configurable delay segment 415. Similar to the predistortion circuits described above, the predistortion circuit 400 includes an RF input 402 and an RF output 404 and includes a primary signal path 410 coupled to a secondary signal path 420 with couplers 412, 414. In this embodiment, the configurable delay segment includes a plurality of switchable delay elements 416-1 to 416-n that are switchably coupled in series within the primary signal path 410 together with bypass lines 418-1, 418-n. A controller 430 may thus selectively cause the RF signal to pass through any combination of the switchable delay elements 416-1, 416-n to provide different delay configurations or settings, for example, depending upon the RF loading conditions. The delay elements 416-1 to 416-n may provide substantially the same delay or different delays (e.g., by using different lengths of delay lines).

Figure 5:
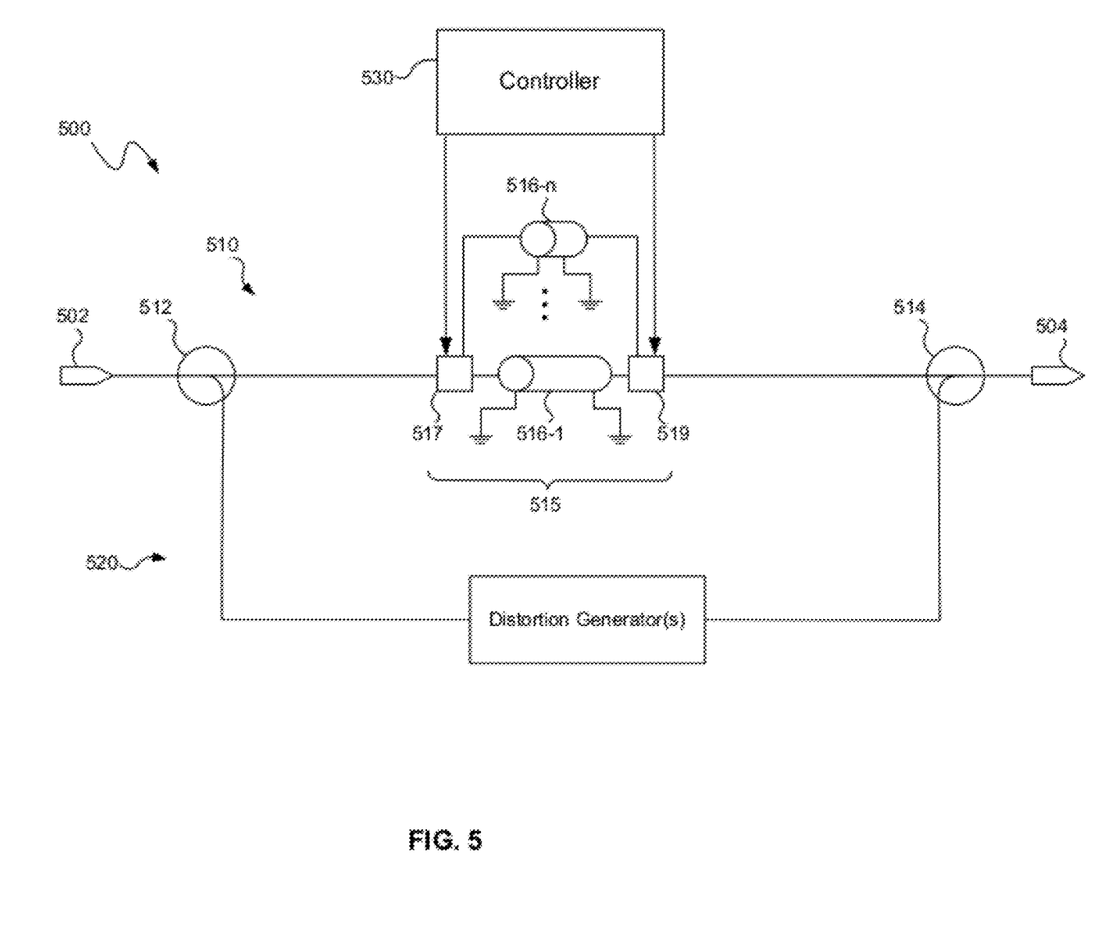
FIG. 5 is a schematic diagram of a distortion compensation circuit including a configurable delay segment, consistent with yet another embodiment of the present invention.

FIG. 5 shows yet another embodiment of a predistortion circuit 500 including a configurable delay segment 515. Similar to the predistortion circuits described above, the predistortion circuit 500 includes an RF input 502 and an RF output 504 and includes a primary signal path 510 coupled to a secondary signal path 520 with couplers 512, 514. In this embodiment, the configurable delay segment 515 includes a plurality of switchable delay elements 516-1 to 516-n in parallel and switchably coupled to the primary signal path 510. The switchable delay elements 516-1 to 516-n may each provide a different delay (e.g., delay lines with different lengths). A controller 530 may thus selectively cause the RF signal to pass through any one of the switchable delay elements 516-1 to 516-n to provide different delay configurations or settings.

Accordingly, the distortion compensation circuits with configurable delay segments, as described herein, may significantly improve distortion compensation in systems that operate in different modes with different RF loading conditions.

Consistent with one embodiment, a distortion compensation circuit is provided for compensation of distortion produced by at least one non-linear element. The distortion compensation circuit includes a primary signal path configured to carry at least a portion of the magnitude of an input signal. The primary signal path includes a configurable delay segment for delaying the signal carried on the primary signal path. The configurable delay segment is configurable in response to at least one control signal to provide different delay settings. The distortion compensation circuit also includes at least one secondary signal path coupled to the primary signal path and configured to receive at least a portion of the input signal. The secondary signal path includes at least one distortion generator configured to generate distortion products from the input signal on the secondary path. The secondary signal path is configured to add at least a portion of the distortion products to the input signal carried on the primary signal path.

Consistent with another embodiment, a configurable delay segment is provided for use in a distortion compensation circuit. The configurable delay segment includes: an RF input line and an RF output line configured to carry an RF signal; at least first and second controllable switches coupled to the RF input line and the RF output line, respectively; at least one switchable delay element coupled between the first and second switches, the switchable delay element being configured to pass the RF signal from the RF input line to the RF output line with a predetermined delay; and at least one bypass line extending between the first and second switches, the bypass line being configured to pass the RF input signal from the RF input line to the RF output line with a negligible delay, wherein the switches are configured to couple either the switchable delay line or the bypass line to the RF input line and the RF output line.

Consistent with a further embodiment, an optical transmitter includes an RF signal input configured to provide an RF input signal and a predistortion circuit configured to receive the RF input signal and to generate a predistorted RF input signal. The predistortion circuit includes a primary signal path configured to receive at least a portion of the RF input signal and a secondary signal path coupled to the primary signal path and configured to receive at least a portion of the input signal. The primary signal path includes a configurable delay segment for delaying the RF signal carried on the primary signal path. The configurable delay segment is configurable in response to at least one control signal to provide different delay settings. The secondary signal path includes at least one distortion generator configured to produce intermodulation distortion products from the RF input signal on the secondary path. The predistortion circuit is configured to combine the intermodulation distortion products on the secondary signal path with the delayed RF signal on the primary signal path to produce the predistorted RF input signal. The optical transmitter further includes a laser configured to receive the predistorted RF input signal and to generate a modulated optical output, wherein the predistorted RF input signal compensates for distortion generated by at least the laser, and a controller coupled to the predistortion circuit and configured to generate the at least one control signal.

Consistent with yet another embodiment, a method is provided for compensating for distortion produced by at least one non-linear element. The method includes: providing a distortion compensation circuit including a primary signal path and at least one secondary signal path coupled to the primary signal path; configuring a configurable delay segment in the primary signal path with a selected delay setting in response to a control signal generated in response to at least one operation mode; receiving a portion of an RF signal on the primary signal path; causing the RF signal to be delayed on the primary signal path in accordance with the selected delay setting; receiving a portion of an RF signal on the secondary signal path; generating distortion from the RF input signal on the secondary signal path; and combining the distortion on the secondary signal path with the delayed RF signal on the primary path to produce the RF signal with compensating distortion.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An optical transmitter comprising:
   an RF signal input configured to provide an RF input signal;
   a predistortion circuit configured to receive the RF input signal and to generate a predistorted RF input signal, the predistortion circuit comprising a primary signal path configured to receive at least a portion of the RF input signal and a secondary signal path coupled to the primary signal path and configured to receive at least a portion of the input signal, the primary signal path including a configurable delay segment for delaying the RF signal carried on the primary signal path, the configurable delay segment being configurable in response to at least one control signal to provide different delay settings, and the secondary signal path including at least one distortion generator configured to produce intermodulation distortion products from the RF input signal on the secondary path, wherein the predistortion circuit is configured to combine the intermodulation distortion products on the secondary signal path with the delayed RF signal on the primary signal path to produce the predistorted RF input signal;
   a laser configured to receive the predistorted RF input signal and to generate a modulated optical output, wherein the predistorted RF input signal compensates for distortion generated by at least the laser; and
   a controller coupled to the predistortion circuit and configured to generate the at least one control signal, wherein the controller is configured to generate at least a first control signal in response to at least a first transmitter operation mode and to generate at least a second control signal in response to at least a second transmitter operation mode, wherein the configurable delay segment is responsive to the first and second control signals to provide at least first and second delay settings, respectively, and wherein the first and second transmitter operation modes provide different RF loading conditions.

2. The optical transmitter of claim 1 wherein the configurable delay segment includes at least one switchable delay element coupled to the primary signal path with controllable switches.

3. The optical transmitter of claim 2 wherein the configurable delay segment includes a bypass line coupled in parallel with the at least one delay element, and wherein the controllable switches are configured to switch to either the switchable delay element or the bypass line in response to the control signal.

4. The optical transmitter of claim 3 wherein the configurable delay segment includes a fixed delay element coupled to the primary signal path.

5. The optical transmitter of claim 1 wherein the first transmitter operation mode includes a 15, 32 or 50 channel QAM mode, and wherein the second transmitter operation mode includes a 153 channel QAM mode.

6. A method of compensating for distortion produced by at least one non-linear element, the method comprising:
   providing a distortion compensation circuit including a primary signal path and at least one secondary signal path coupled to the primary signal path;

configuring a configurable delay segment in the primary signal path with a selected delay setting in response to a control signal generated in response to at least one operation mode, wherein the configurable delay segment is configured with at least first and second delay settings in response to at least first and second control signals generated in response to at least first and second transmitter operation modes, respectively, and wherein the first and second transmitter operation modes provide different RF loading conditions on the distortion compensation circuit;

receiving a portion of an RF signal on the primary signal path;

causing the RF signal to be delayed on the primary signal path in accordance with the selected delay setting;

receiving a portion of an RF signal on the secondary signal path;

generating distortion from the RF input signal on the secondary signal path; and combining the distortion on the secondary signal path with the delayed RF signal on the primary path to produce the RF signal with compensating distortion.

7. The method of claim 6 wherein the non-linear element includes a laser in an optical transmitter, wherein the RF signal with compensating distortion is a predistorted RF signal, and further comprising providing the predistorted RF signal to the laser.

8. The method of claim 6 wherein the first transmitter operation mode includes a 15, 32 or 50 channel QAM mode, and wherein the second transmitter operation mode includes a 153 channel QAM mode.

9. The method of claim 6 wherein generating the distortion includes generating at least second order intermodulation distortion products.

10. The method of claim 6 wherein the configurable delay segment includes at least one switchable delay element coupled to the primary signal path with controllable switches.

* * * * *